US010994511B2

(12) United States Patent
Yamamoto et al.

(10) Patent No.: US 10,994,511 B2
(45) Date of Patent: May 4, 2021

(54) FUNCTIONAL LAYER INCLUDING LAYERED DOUBLE HYDROXIDE, AND COMPOSITE MATERIAL

(71) Applicant: NGK INSULATORS, LTD., Nagoya (JP)

(72) Inventors: Sho Yamamoto, Nagoya (JP); Shohei Yokoyama, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 110 days.

(21) Appl. No.: 16/227,469

(22) Filed: Dec. 20, 2018

(65) Prior Publication Data

US 2019/0131606 A1 May 2, 2019

Related U.S. Application Data

(63) Continuation of application No. PCT/JP2017/012435, filed on Mar. 27, 2017.

(30) Foreign Application Priority Data

Jun. 24, 2016 (JP) .............................. JP2016-125531
Jun. 24, 2016 (JP) .............................. JP2016-125554

(Continued)

(51) Int. Cl.
*B32B 5/18* (2006.01)
*B32B 9/00* (2006.01)
(Continued)

(52) U.S. Cl.
CPC ................. *B32B 5/18* (2013.01); *B32B 9/00* (2013.01); *B32B 9/005* (2013.01); *C01F 7/00* (2013.01);
(Continued)

(58) Field of Classification Search
CPC . B32B 9/00; B32B 2305/026; B32B 2457/10; B32B 5/18; B32B 9/005;
(Continued)

(56) References Cited

U.S. PATENT DOCUMENTS 9,293,791 B2    3/2016  Yamada et al.
2015/0079298 A1  3/2015  Ferreira et al.
(Continued)

FOREIGN PATENT DOCUMENTS

CN    104067437 A    9/2014
JP    2005-089277 A1  4/2005
(Continued)

OTHER PUBLICATIONS

International Search Report and Written Opinion (Application No. PCT/JP2017/012435) dated Jun. 13, 2017 (with English translation).

(Continued)

*Primary Examiner* — Adam A Arciero
(74) *Attorney, Agent, or Firm* — Burr & Brown, PLLC

(57) ABSTRACT

There is provided a functional layer including a layered double hydroxide (LDH). The functional layer includes a first layer with a thickness of 0.10 μm or more, the first layer being composed of fine LDH particles having a diameter of less than 0.05 μm, and a second layer composed of large LDH particles having a mean particle diameter of 0.05 μm or more, the second layer being an outermost layer provided on the first layer.

15 Claims, 5 Drawing Sheets

(30) Foreign Application Priority Data

Jun. 24, 2016 (JP) .............................. JP2016-125562
Jan. 31, 2017 (WO) ................. PCT/JP2017/003333

(51) Int. Cl.

| | |
|---|---|
| *C01F 7/00* | (2006.01) |
| *C01G 23/00* | (2006.01) |
| *C01G 53/00* | (2006.01) |
| *H01M 50/403* | (2021.01) |
| *H01M 50/409* | (2021.01) |
| *H01M 50/431* | (2021.01) |
| *H01M 50/449* | (2021.01) |
| *C01F 7/02* | (2006.01) |
| *C01G 23/04* | (2006.01) |
| *C01G 53/04* | (2006.01) |
| *H01M 10/26* | (2006.01) |
| *C01G 23/047* | (2006.01) |
| *H01M 4/24* | (2006.01) |
| *H01M 4/32* | (2006.01) |

(52) U.S. Cl.
CPC ............... *C01F 7/02* (2013.01); *C01G 23/00* (2013.01); *C01G 23/04* (2013.01); *C01G 23/047* (2013.01); *C01G 53/00* (2013.01); *C01G 53/006* (2013.01); *C01G 53/04* (2013.01); *H01M 4/244* (2013.01); *H01M 4/32* (2013.01); *H01M 10/26* (2013.01); *H01M 50/403* (2021.01); *H01M 50/409* (2021.01); *H01M 50/431* (2021.01); *H01M 50/449* (2021.01); *B32B 2305/026* (2013.01); *B32B 2457/10* (2013.01); *C01P 2002/22* (2013.01); *C01P 2002/74* (2013.01); *C01P 2004/03* (2013.01); *C01P 2006/16* (2013.01); *C01P 2006/40* (2013.01)

(58) Field of Classification Search
CPC ........ C04B 2237/343; C04B 2237/346; C04B 41/52; C04B 41/5072; C04B 41/009; C04B 2103/0013; C04B 2103/0019; C04B 2103/0021; C04B 35/48; C04B 38/00; C04B 41/0072; C04B 41/4521; C04B 41/4535; C04B 41/4537; C04B 2111/00853; C04B 2235/3225; C04B 2235/3246; C04B 2235/6025; C04B 2235/6567; C04B 2237/348; C04B 35/111; C04B 35/486; C04B 35/6342; C04B 35/64; C04B 41/89; C01F 7/00; C01F 7/02; C01G 23/00; C01G 23/04; C01G 23/047; C01G 53/00; C01G 53/006; C01G 53/04; C01P 2002/22; C01P 2002/74; C01P 2004/03; C01P 2006/16; C01P 2006/40; H01M 10/0562; H01M 10/26; H01M 10/36; H01M 2300/0071; H01M 4/244; H01M 4/32; H01M 50/403; H01M 50/409; H01M 50/431; H01M 50/449; Y02E 60/10

See application file for complete search history.

(56) References Cited

U.S. PATENT DOCUMENTS

| | | | |
|---|---|---|---|
| 2016/0141582 A1* | 5/2016 | Fujisaki | H01M 50/431 429/144 |
| 2017/0077476 A1 | 3/2017 | Kitoh et al. | |
| 2017/0194614 A1 | 7/2017 | Yokoyama et al. | |
| 2017/0200981 A1 | 7/2017 | Yokoyama et al. | |
| 2017/0260048 A1 | 9/2017 | Yamamoto et al. | |

FOREIGN PATENT DOCUMENTS

| | | | | |
|---|---|---|---|---|
| JP | 2005089277 A | * | 4/2005 | |
| JP | 2010-059005 A1 | | 3/2010 | |
| JP | 2013-201056 A1 | | 10/2013 | |
| JP | 2014-123431 A1 | | 7/2014 | |
| JP | 2015-095286 A1 | | 5/2015 | |
| JP | 2015-520018 A1 | | 7/2015 | |
| WO | 2015/098610 A1 | | 7/2015 | |
| WO | 2016/051934 A1 | | 4/2016 | |
| WO | 2016/067885 A1 | | 5/2016 | |
| WO | 2016/076047 A1 | | 5/2016 | |
| WO | 2016/098513 A1 | | 6/2016 | |
| WO | WO-2016098513 A1 | * | 6/2016 | ........... C04B 35/057 |

OTHER PUBLICATIONS

International Search Report and Written Opinion (Application No. PCT/JP2017/003333) dated May 16, 2017 (with English translation).

Yaohang Gu et al., "NiTi Layered Double Hydroxide Thin Films for Advanced Pseudocapacitor Electrodes," *Journal of Materials Chemistry A*, vol. 1, No. 36, Jan. 1, 2013, pp. 10655-10661.

Extended European Search Report (Application No. 17814971.2) dated Dec. 18, 2019.

Chinese Office Action (with English translation), Chinese Application No. 20170038283.0, dated Jan. 6, 2021 (13 pages).

* cited by examiner

EXAMPLE 1 (COMPARATIVE)

EXAMPLE 3

EXAMPLE 3

EXAMPLE 4

EXAMPLE 4

FUNCTIONAL LAYER INCLUDING LAYERED DOUBLE HYDROXIDE, AND COMPOSITE MATERIAL

CROSS-REFERENCE TO RELATED APPLICATIONS

This application is a continuation application of PCT/JP2017/012435 filed Mar. 27, 2017, which claims priority to PCT/JP2017/003333 filed Jan. 31, 2017, Japanese Patent Application No. 2016-125531 filed Jun. 24, 2016, Japanese Patent Application No. 2016-125554 filed Jun. 24, 2016, and Japanese Patent Application No. 2016-125562 filed Jun. 24, 2016, the entire contents all of which are incorporated herein by reference.

BACKGROUND OF THE INVENTION

1. Field of the Invention

The present invention relates to a functional layer including a layered double hydroxide, and a composite material.

2. Description of the Related Art

A layered double hydroxide (hereafter also referred to LDH) is a material having an exchangeable anions and $H_2O$ as intermediate layers between stacked basic hydroxide layers, and is used as, for example, catalysts, adsorbents and dispersants in polymers for improving heat resistance to take its advantage.

The LDH has also been attractive as a material that conducts hydroxide ions; hence, addition of the LDH to an electrolyte of an alkaline fuel cell and a catalytic layer of a zinc air battery has been studied. In particular, the use of a LDH as a solid electrolyte separator for alkaline secondary batteries such as nickel-zinc secondary batteries and zinc-air secondary batteries has been recently proposed, and composite materials with a LDH containing functional layer suitable for such a separator application are known. For example, Patent Document 1 (WO2015/098610) discloses a composite material comprising a porous substrate and a LDH containing functional layer having no water permeability formed on and/or in the porous substrate. The LDH containing functional layer is represented by the general formula: $M^{2+}_{1-x}M^{3+}_x(OH)_2A^{n-}_{x/n} \cdot mH_2O$, wherein $M^{2+}$ is a divalent cation such as $Mg^{2+}$, $M^{3+}$ is a trivalent cation such as $Al^{3+}$, $A^{n-}$ is an n-valent anion such as $OH^-$, $CO_3^{2-}$, n is an integer of 1 or more, x is 0.1 to 0.4, and m is 0 or above 0. The LDH containing functional layer disclosed in Patent Document 1 is densified to such an extent that it has no water permeability. When the LDH is used as a separator, it can prevent deposition of dendritic zinc and penetration of carbon dioxide from an air electrode in zinc air batteries that are obstacles to practical use of alkaline zinc secondary batteries.

Patent Document 2 (WO2016/076047) discloses a separator structure comprising a LDH separator combined with a porous substrate, wherein the LDH separator has high density with high gas and/or water impermeability. This patent also discloses that the LDH separator has high density with helium permeability per unit area of 10 cm/min·atm or less.

Unfortunately, high hydroxide ion conductivity is required for electrolytic solutions of alkaline secondary batteries (for example, metal air batteries and nickel zinc batteries) including LDHs, and thus the use of strong alkaline aqueous potassium hydroxide solution at pH of about 14 is desired. For this purpose, it is desirable for LDH to have high alkaline resistance such that it is barely deteriorated even in such a strong alkaline electrolytic solution. In this regard, Patent Document 3 (WO2016/051934) discloses a LDH containing battery that contains a metallic compound containing a metallic element (for example, Al) corresponding to $M^{2+}$ and/or $M^{3+}$ in the general formula described above dissolved in the electrolytic solution to suppress erosion of the LDH.

CITATION LIST

Patent Documents

Patent Document 1: WO2015/098610
Patent Document 2: WO2016/076047
Patent Document 3: WO2016/051934

SUMMARY OF THE INVENTION

The present inventors have now found that the alkaline resistance of a LDH containing layer is significantly improved by covering the surface of a dense LDH containing layer composed of fine LDH particles with large LDH particles having a diameter of 0.05 µm or more.

Accordingly, an object of the present invention is to provide a LDH containing functional layer with significantly improved alkaline resistance, and a composite material including the LDH containing functional layer.

One embodiment of the present invention provides a functional layer comprising a layered double hydroxide (LDH), wherein the functional layer comprises a first layer with a thickness of 0.10 µm or more, the first layer being composed of fine LDH particles having a diameter of less than 0.05 µm, and a second layer composed of large LDH particles having a mean particle diameter of 0.05 µm or more, the second layer being an outermost layer provided on the first layer.

Another embodiment of the present invention provides a composite material that comprises a porous substrate and a functional layer provided on the porous substrate and/or partly embedded in the porous substrate.

Another embodiment of the present invention provides a battery including the functional layer or the composite material as a separator.

DETAILED DESCRIPTION OF THE INVENTION

LDH Containing Functional Layer and Composite Material

Figure 1:
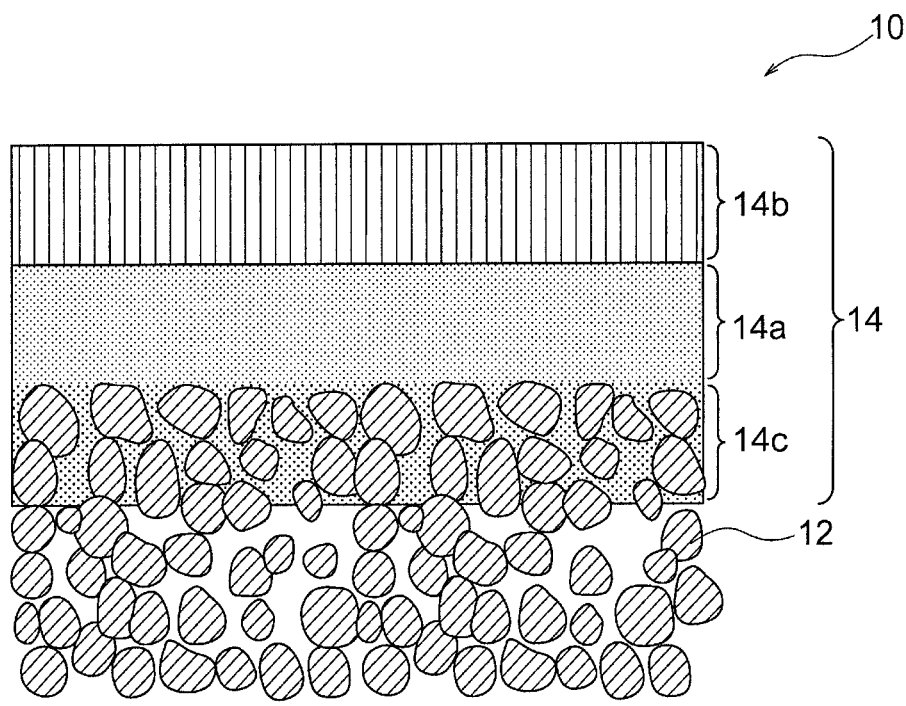
FIG. 1 is a schematic cross-sectional view illustrating a LDH containing composite material of one embodiment of the present invention.

As schematically shown in FIG. 1, the functional layer 14 of the present invention is a layer containing layered double hydroxide (LDH), and has a first layer 14a, a second layer 14b, and an optional third layer 14c. In other words, each of the first layer 14a, the second layer 14b and the optional third layer 14c contains the LDH. The first layer 14a is a layer having a thickness of 0.10 μm or more and composed of fine LDH particles having a diameter of less than 0.05 μm. The second layer 14b is an outermost layer provided on the first layer 14a, and is a layer composed of large LDH particles having a mean particle diameter of 0.05 μm or more. In this manner, the alkaline resistance of the LDH containing layer can be significantly improved by covering the surface of a dense LDH containing layer composed of fine LDH particles with large LDH particles having a diameter of 0.05 μm or more.

Since the first layer 14a is filled with fine LDH particles having a diameter of less than 0.05 μm to be a dense layer, the layer can thus function as an LDH separator. However, as mentioned above, high alkaline resistance that barely exhibits the deterioration even in a strong alkaline electrolytic solution is desired for the LDH for alkaline secondary batteries. In the functional layer 14 of the present invention, the surface of the dense first layer 14a composed of fine LDH particles is covered with large LDH particles having a mean particle diameter of 0.05 μm or more, hence the alkaline resistance can be significantly improved. This improvement is believed to be based on prevention from decreasing the density due to deterioration of the first layer 14, because large LDH particles constituting the second layer 14b is chemically stable and the surface of the first layer is covered with such large particles. For example, some findings by the present inventors are as follows: In the case that the mean particle diameter of the LDH particles constituting the outermost surface layer is smaller than 0.05 μm, the density of the LDH containing functional layer decreases during immersion in an aqueous potassium hydroxide solution having a predetermined concentration at 70° C. for three weeks. In the case that the mean particle diameter of the LDH particles constituting the outermost surface layer is larger than 0.05 μm, the density does not vary even during immersion in an aqueous potassium hydroxide solution having a predetermined concentration at 70° C. for three weeks.

The first layer 14a is composed of fine LDH particles. The fine LDH particles consist mainly of LDH and may contain other trace components such as titania. In other words, the first layer 14a is mainly composed of LDH and is not a composite layer embedded in another material. Accordingly, in the case of the composite material 10 in which a part of the functional layer 14 is embedded in the porous substrate 12 as shown in FIG. 1, the part of the functional layer embedded in the porous substrate 12 is not the first layer 14a, but is regarded as a third layer 14c. The first layer 14a is formed on the outermost surface (also referred to as the main surface) of the porous substrate 12, and is different from the third layer 14c in that LDH particles are embedded in the porous substrate 12. In other words, the first layer 14a does not include other materials such as the porous substrate 12. The diameter of the fine LDH particles constituting the first layer 14a is less than 0.05 μm, preferably 0.025 μm or less. Since smaller fine LDH particles are preferred, the lower limit of the diameter may be any value, but the diameter of the fine LDH particles is typically 0.001 μm or more, more typically 0.003 μm or more. The diameter of the fine LDH particles can be measured by giving the cross-sectional polished surface of the functional layer 14 by an ionic milling system and then observing the microstructure of the cross-sectional polished surface with a scanning transmission electron microscope (STEM). The thickness of the first layer 14a is 0.10 μm or more, preferably 0.10 to 4.5 μm, more preferably 0.50 to 3.0 μm, further preferably 1.0 to 2.5 μm. As described above, the thickness of the first layer 14a is two or more times the diameter of the fine LDH particles. This indicates that the first layer 14a is a highly dense structure in that multiple fine LDH particles are stacked in the layer thickness direction and these fine L DH particles are not simply connected in plane. In summary, a large number of fine LDH particles are three-dimensionally connected to each other to form one first layer 14a as a whole.

The second layer 14b is composed of large LDH particles. The large LDH particles consist mainly of LDH and may contain other trace components such as titania. Since the second layer 14b is the outermost surface layer provided on the first layer 14a, the second layer is mainly composed of LDH, and is not embedded in another material such as the porous substrate 12, like the first layer 14a. The mean particle diameter of the large LDH particles constituting the second layer 14b is 0.05 μm or more, preferably 0.05 to 5.0 μm, and more preferably 0.1 to 5.0 μm. The mean particle diameter of large LDH particles can be determined by observing the surface of the second layer 14b with a scanning electron microscope (SEM) and measuring the largest distance of the particle size based on the resultant images. The images are measured at 10,000-fold magnification or more, and all the measured pore sizes are listed in order of size to calculate the average, from which the subsequent 15 larger sizes and the subsequent 15 smaller sizes, i.e., 30 diameters in total, are selected in one field of view. The selected sizes of two fields of view are then averaged to yield the average pore size. In the measurement, a dimension measuring function in software of SEM can be used. The second layer 14b may have any thickness, but is preferably of 0.1 to 10 μm. Although the thickness of the second layer 14b is typically equivalent to the height of one large LDH particle, two or more large LDH particles may be stacked locally or wholly.

The functional layer 14 (i.e. the first layer 14a, the second layer 14b and optionally the third layer 14c) comprises layered double hydroxide (LDH). As is generally known, the LDH is composed of a plurality of basic hydroxide layers and intermediate layers interposed between these basic hydroxide layers. The basic hydroxide layers are each mainly composed of metallic elements (typically metallic ions) and OH groups. The intermediate layers of the LDH contained in the functional layer are composed of anions and $H_2O$. The anions are monovalent or multivalent anions, preferably monovalent or divalent ions. Preferably, the anions in the LDH include $OH^-$ and/or $CO_3^{2-}$. Meanwhile, high hydroxide ion conductivity is required for electrolytic solutions of alkaline secondary batteries (for example, metal air batteries and nickel zinc batteries) including LDHs, and thus the use of aqueous strong-alkaline potassium hydroxide solution at pH of about 14 is desired. For this purpose, it is desirable for LDH to have high alkaline resistance such that it is barely deteriorated even in such a strong alkaline electrolytic solution. Accordingly, the LDH in the present invention preferably causes no changes in surface microstructure and crystalline structure for evaluation of alkali resistance as described later, and the LDH may have any composition without restriction. The LDH has high ion conductivity based on its inherent properties, as described above.

The LDH contained in the functional layer 14 preferably undergoes no changes in the surface microstructure and crystalline structure when immersed in a 6 mol/L aqueous potassium hydroxide solution containing zinc oxide in a concentration of 0.4 mol/L at 70° C. for three weeks or 504 hours because such an LDH has high alkaline resistance. The presence of a change in the surface microstructure can be preferably determined by SEM (Scanning Electron Microscopy), and the presence of a change in the crystalline structure can be preferably determined by crystal structural analysis (for example, a variation in (003) peak) by XRD (X-ray diffractometry). Potassium hydroxide is a typical strong alkaline substance, and the composition of an aqueous potassium hydroxide solution is equivalent to a typical strong alkaline electrolyte for alkaline secondary batteries. Accordingly, the above evaluation method involving immersion in such a strong alkaline electrolyte for three weeks at a high temperature of 70° C. can be a severe alkaline resistance test. As described above, high alkaline resistance that barely exhibits the deterioration even in a strong alkaline electrolytic solution is desired for the LDH in alkaline secondary batteries. In this respect, the functional layer of the present embodiment has high alkaline resistance in that the surface microstructure and crystalline structure do not change even in such a severe alkaline resistance test. On the other hand, the functional layer of the present embodiment can also exhibit high ion conductivity suitable for the use as a separator for alkaline secondary batteries to take the advantage of the inherent properties of LDH. The present embodiment can accordingly provide a LDH containing functional layer having not only high ion conductivity but also high alkaline resistance.

According to a preferred embodiment of the present invention, the basic hydroxide layers of LDH are composed of Ni, Ti, OH groups and optional incidental impurities. The intermediate layers of LDH are composed of anions and $H_2O$ as described above. Although the alternately stacked structure itself of basic hydroxide layers and intermediate layers is basically the same as the commonly known alternately stacked structure of LDH, the functional layer of the embodiment, which is composed of the basic hydroxide layers mainly having Ni, Ti and OH groups of LDH, can exhibit high alkaline resistance. Although the reason is not clear, it is believed that no element (for example, Al) easily dissolved in an alkaline solution is intentionally added to the LDH of the embodiment. Nevertheless, the functional layer of the embodiment can also exhibit high ion conductivity suitable for separators for alkaline secondary batteries. Ni in the LDH can have the form of nickel ions. Although nickel ions in the LDH are typically believed to be $Ni^{2+}$, they may be present in any other valence, for example, $Ni^{3+}$. Ti in the LDH can have the form of titanium ions. Although titanium ions in the LDH are typically believed to be $Ti^{4+}$, they may be present in any other valence, for example, $Ti^{3+}$. Each of the incidental impurities is any element which may be inevitably mixed in a manufacturing process, and it may be mixed into the LDH from, for example, a raw material or a basic material. As described above, it is impractical or impossible to strictly specify the LDH with a general formula since valences of Ni and Ti are not necessarily confirmed. Assuming that the basic hydroxide layers are mainly composed of $Ni^{2+}$, $Ti^{4+}$ and OH groups, the basic composition of the corresponding LDH can be represented by the general formula: $Ni^{2+}_{1-x}Ti^{4+}_{x}(OH)_2A^{n-}_{2x/n} \cdot mH_2O$, wherein $A^{n-}$ is an n-valent anion, n is an integer of 1 or more, preferably 1 or 2, x is above 0 to below 1, preferably 0.01 to 0.5, and m is a real number of 0 or more, typically a real number above 0 or 1 or more. However, it should be understood that the general formula indicates merely the "basic composition", and it may be replaced with other elements or ions (including elements with other valences of the same element, or elements or ions that may be unavoidably mixed in the manufacturing process) to such an extent that the elements such as $Ni^{2+}$, and $Ti^{4+}$ do not impair the basic properties of LDH.

According to another preferred embodiment of the present invention, the basic hydroxide layers of LDH comprise Ni, Al, Ti and OH groups. The intermediate layers are composed of anions and $H_2O$ as described above. Although the alternately stacked structure itself of basic hydroxide layers and intermediate layers is basically the same as the generally known alternately stacked structure of LDH, the functional layer of the embodiment, which is composed of the basic hydroxide layers mainly having Ni, Al, Ti and OH groups of LDH, can exhibit high alkaline resistance. Although the reason is not clear, it is believed that Al, which has been considered to be easily dissolved in an alkaline solution, is hard to elute into the alkaline solution due to some interaction with Ni and Ti. Nevertheless, the functional layer of the embodiment can also exhibit high ion conductivity suitable for separators for alkaline secondary batteries. Ni in the LDH can have the form of nickel ions. Although nickel ions in the LDH are typically believed to be $Ni^{2+}$, they may be present in any other valence, for example, $Ni^{3+}$. Al in the LDH can have the form of nickel ions. Although aluminum ions in the LDH are typically believed to be $Al^{3+}$, they may be present in any other valence. Ti in the LDH can have the form of titanium ions. Although titanium ions in the LDH are typically believed to be $Ti^{4+}$, they may be present in any other valence, for example, $Ti^{3+}$. The basic hydroxide layers may contain other elements or ions as long as they contain Ni, Al, Ti and OH groups. However, the basic hydroxide layers preferably contain Ni, Al, Ti and OH groups as main constituent elements. That is, it is preferred that the basic hydroxide layers are mainly composed of Ni, Al, Ti and OH groups. Accordingly, the basic hydroxide layers are typically composed of Ni, Al, Ti, OH groups and optional incidental impurities. Each of the incidental impurities is any element which may be inevitably mixed in a manufacturing process, and it may be mixed into the LDH from, for example, a raw material or a basic material. As described above, it is impractical or impossible to strictly specify the LDH with a general formula since valences of Ni, Al and Ti are not necessarily confirmed. Assuming that the basic hydroxide layers are mainly composed of $Ni^{2+}$, $Al^{3+}$, $Ti^{4+}$ and OH groups, the basic composition of the corresponding LDH can be represented by the general formula: $Ni^{2+}_{1-x-y}Al^{3+}_{x}Ti^{4+}_{y}(OH)_2A^{n-}_{(x+2y)/n} \cdot mH_2O$, wherein $A^{n-}$ is an n-valent anion, n is an integer of 1 or more, preferably 1 or 2, x is above 0 to below 1, preferably 0.01 to 0.5, y is above 0 to below 1, preferably 0.01 to 0.5, x+y is above 0 to below 1, and m is a real number of 0 or more, typically a real number of above 0 or 1 or more. However, it should be understood that the general formula indicates merely the "basic composition", and it may be replaced with other elements or ions (including elements with other valences of the same element, or elements or ions that may be unavoidably mixed in the manufacturing process) to such an extent that the elements such as $Ni^{2+}$, $Al^{3+}$ and $Ti^{4+}$ do not impair the basic properties of LDH.

The functional layer 14 (in particular, the LDH contained in the functional layer 14) has preferably hydroxide ion conductivity. The functional layer has preferably an ion conductivity of at least 0.1 mS/cm, more preferably at least 0.5 mS/cm, and most preferably at least 1.0 mS/cm. Higher ion conductivity is preferred. The upper limit thereof is for example, 10 mS/cm, which should not be construed as limiting. Such high ion conductivity is particularly suitable for battery application. For example, it is preferred to lower the resistance by thinning in order to put the LDH into practical use, and providing the LDH containing functional layers with desirably low resistance according to the embodiment is particularly advantageous in the application of LDH as a solid electrolyte separator for alkaline secondary batteries such as zinc air batteries or nickel zinc batteries.

Preferably, the functional layer 14 is disposed on the porous substrate and/or partly embedded into the porous substrate 12. That is, a preferred embodiment of the present invention provides a composite material 10 comprising a porous substrate 12 and a functional layer disposed on the porous substrate 12 and/or partly embedded into the porous substrate. For example, as in the composite material 10 shown in FIG. 1, a part of the functional layer 14 may be embedded in the porous substrate 12 and the remaining part may be disposed on the porous substrate 12. In this case, the part of the functional layer 14 on the porous substrate 12 consists of the first layer 14a and the second layer 14b, and the part of the functional layer embedded in the porous substrate 12 (composite layer) consists of the third layer 14c. The third layer 14c is typically in the form in which the inside of the pores of the porous substrate 12 is filled with the LDH.

The porous substrate in the composite material 10 of the present invention can preferably form the LDH containing functional layer thereon and/or therein. The substrate may be composed of any material and have any porous structure. Although it is typical to form the LDH containing functional layer on and/or in the porous substrate, the LDH containing functional layer may be formed on a non-porous substrate and then the non-porous substrate may be modified into a porous form by any known method. In any case, the porous substrate has advantageously a porous structure having good water permeability and it can deliver electrolytic solution to the functional layer when incorporated into a battery as a separator for the battery.

The porous substrate 12 is composed of, preferably, at least one selected from the group consisting of ceramic materials, metallic materials, and polymeric materials, more preferably, at least one selected from the group consisting of ceramic materials and polymeric materials. More preferably, the porous substrate is composed of ceramic materials. In this case, preferred examples of the ceramic material include alumina, zirconia, titania, magnesia, spinel, calcia, cordierite, zeolite, mullite, ferrite, zinc oxide, silicon carbide, and any combination thereof. More preferred examples include alumina, zirconia, titania, and any combination thereof. Particularly preferred examples include alumina, zirconia (for example, yttria-stabilized zirconia (YSZ)), and combination thereof. Using these porous ceramics, a LDH containing functional layer with high density can be readily formed. Preferred examples of the metallic material include aluminum, zinc, and nickel. Preferred examples of the polymeric material include polystyrene, polyethersulfone, polypropylene, epoxy resin, poly(phenylene sulfide), hydrophilized fluororesin (such as tetrafluoro resin: PTFE), cellulose, nylon, polyethylene and any combination thereof. All these preferred materials have high resistance to the alkaline electrolytic solution of the battery.

The porous substrate 12 has preferably a mean pore diameter of at most 100 µm, more preferably at most 50 µm, for example, typically 0.001 to 1.5 µm, more typically 0.001 to 1.25 µm, further more typically 0.001 to 1.0 µm, particularly typically 0.001 to 0.75 µm, most typically 0.001 to 0.5 µm. Within these ranges, a dense LDH containing functional layer having no water permeability can be formed while keeping desirable water permeability and strength as a support for the porous substrate without the functional layer. In the present invention, the mean pore size can be determined by measuring the largest dimension of each pore based on the electron microscopic image of the surface of the porous substrate. The electron microscopic image is measured at 20,000-fold magnification or more. All the measured pore sizes are listed in order of size to calculate the average, from which the subsequent 15 larger sizes and the subsequent 15 smaller sizes, i.e., 30 diameters in total, are selected in one field of view. The selected sizes of two fields of view are then averaged to yield the average pore size. In the measurement, a dimension measuring function in software of SEM or image analyzing software (for example, Photoshop manufactured by Adobe) can be used.

The porous substrate 12 has a porosity of preferably 10 to 60%, more preferably 15 to 55%, most preferably 20 to 50%. Within these ranges, the resulting dense LDH containing functional layer has no water permeability while the porous substrate keeps desirable water permeability and required strength as a support. The porosity of the porous substrate can be preferably measured by Archimedes' method.

The functional layer 14 preferably has no air permeability. That is, it is preferred that the functional layer be densified with the LDH to such an extent that it has no air permeability. In the present specification, the phrase "having no air permeability" has the following meaning: no bubbling of helium gas is observed at one side of the measured object, i.e., the functional layer or the porous substrate even if helium gas is brought into contact with the other side in water at a differential pressure of 0.5 atm across the thickness, as described in PLT 2 (WO 2016/076047). By this densification, the functional layer or the composite material as a whole selectively allows only the hydroxide ion due to its hydroxide ion conductivity to pass through, and can function as separators for batteries. In the case of the application of LDH as solid electrolyte separators for batteries, although the bulk LDH compact has high resistance, the LDH containing functional layer in a preferred embodiment of the present invention can be thinned to reduce the resistance because the porous substrate has high strength. In addition, the porous substrate can have high water permeability and air permeability; hence, the electrolyte can reach the LDH containing functional layer when used as solid electrolyte separators of batteries. In summary, the LDH containing functional layer and the composite material of the present invention are very useful materials for solid electrolyte separators applicable to various batteries, such as metal air batteries (for example, zinc air batteries) and various other zinc secondary batteries (for example, nickel zinc batteries).

In the functional layer 14 or the composite material 10 including the functional layer, a helium permeability per unit area is preferably 10 cm/min·atm or less, more preferably 5.0 cm/min·atm or less, most preferably 1.0 cm/min·atm or less. The functional layer having such a range of helium permeability has extremely high density. When the functional layer having a helium permeability of 10 cm/min·atm or less is applied as a separator in an alkaline secondary battery, passage of substances other than hydroxide ions can be effectively prevented. For example, zinc secondary batteries can significantly effectively suppress penetration of zinc ions or zincate ions in the electrolytic solution. Since penetration of Zn is remarkably suppressed in this way, it can be believed in principle that deposition of dendritic zinc can be effectively suppressed in zinc secondary batteries. The helium permeability is measured through supplying helium gas to one surface of the functional layer to allow helium gas to pass through the functional layer and calculating the helium permeability to evaluate density of the functional layer. The helium permeability is calculated from the expression of F/(P×S) where F is the volume of permeated helium gas per unit time, P is the differential pressure applied to the functional layer when helium gas permeates through, and S is the area of the membrane through which helium gas permeates. Evaluation of the permeability of helium gas in this manner can extremely precisely determine the density. As a result, a high degree of density that does not permeate as much as possible (or permeate only a trace amount) substances other than hydroxide ions (in particular, zinc that causes deposition of dendritic zinc) can be effectively evaluated. Helium gas is suitable for this evaluation because the helium gas has the smallest constitutional unit among various atoms or molecules which can constitute the gas and its reactivity is extremely low. That is, helium does not form a molecule, and helium gas is present in the atomic form. In this respect, since hydrogen gas is present in the molecular form ($H_2$), atomic helium is smaller than molecular $H_2$ in a gaseous state. Basically, $H_2$ gas is combustible and dangerous. By using the helium gas permeability defined by the above expression as an index, the density can be precisely and readily evaluated regardless of differences in sample size and measurement condition. Thus, whether the functional layer has sufficiently high density suitable for separators of zinc secondary batteries can be evaluated readily, safely and effectively. The helium permeability can be preferably measured in accordance with the procedure shown in Evaluation 4 in Examples described later.

The LDH constituting the second layer 14b includes agglomerates of platy particles (that is, LDH platy particles), and surfaces of platy particles are preferably oriented perpendicular or oblique to the surface of the functional layer (the surface when macroscopically observed to such an extent that the fine irregularities of the functional layer can be ignored). It is known that LDH crystals have the form of platy particles including a layered structure, and the perpendicular or oblique orientation is very advantageous to the LDH containing functional layers (for example LDH dense membranes). This is because the oriented LDH containing functional layer (for example, oriented LDH dense membrane) has anisotropic conductivity. In detail, the ion conductivity of hydroxide in the direction of the aligned LDH platy particles (that is, the direction parallel to the layer of LDH) is extremely higher than the conductivity in the direction orthogonal to the above aligned direction. In the actual situation, it is already known that the conductivity (S/cm) in the aligning direction in the oriented bulk of the LDH is one order of magnitude higher than the conductivity (S/cm) in the direction orthogonal to the aligning direction. That is, the perpendicular or oblique orientation in the LDH containing functional layer of the present invention causes maximal or significant anisotropy of the conductivity of the oriented LDH in the layer thickness direction (that is, in the direction perpendicular to the surface of the functional layer or the porous substrate). As a result, the conductivity in the layer thickness direction can be maximally or significantly increased. In addition, the LDH containing functional layer is in a layer form; hence, it has a lower resistance than the LDH in a bulk form. The LDH containing functional layer having such an orientation can facilitate the conduction of hydroxide ions in the layer thickness direction. Moreover, the LDH containing functional layer is densified; hence, it is extremely useful in a functional membrane such as battery separators (for example, a hydroxide ion conductive separator for zinc air batteries) that requires high conductivity and density in the layer thickness direction.

The functional layer 14 has preferably a thickness of 100 μm or less, more preferably 75 μm or less, further preferably 50 μm or less, particularly preferably 25 μm or less, most preferably 15 μm or less. Such thinning can reduce the resistance of the functional layer. In the case where the functional layer 14 is the LDH membrane formed on the porous substrate 12, the thickness of the functional layer 14 corresponds to the total thickness of the first layer 14a and the second layer 14b. In the case where the functional layer 14 is formed on the porous substrate 12 and embedded into the porous substrate, the thickness of the functional layer corresponds to the total thickness of the first layer 14a, the second layer 14b and the third layer 14c. In any case, the above thickness leads to a low resistance suitable for practical use in, for example, battery application. Although the lower limit of the thickness of the oriented LDH membrane is not limited because it depends on the application, the thickness is preferably 1 μm or more, more preferably 2 μm or more in order to assure a certain degree of rigidity suitable for a functional membrane such as a separator.

The LDH containing functional layer and the composite material can be produced by any method. They can be produced by appropriately modifying conditions of a known method for producing LDH containing functional layers and composite materials (see, for example, PLT 1 to 3). For example, the LDH containing functional layer and the composite material can be produced by (1) providing a porous substrate, (2) applying a titanium oxide sol or a mixed sol of alumina and titania onto the porous substrate and then heating the sol to form a titanium oxide layer or an alumina/titania layer, (3) immersing the porous substrate into an aqueous raw material solution containing nickel ions ($Ni^{2+}$) and urea, and (4) hydrothermally treating the porous substrate in the aqueous raw material solution to form the LDH containing functional layer on the porous substrate and/or in a porous substrate. In particular, in Step (2), forming the titanium oxide layer or the alumina/titania layer on the porous substrate can not only produce a raw material for the LDH, but also serve as a seed of LDH crystalline growth and uniformly form the LDH containing functional layer that is highly densified on the surface of the porous substrate. In addition, in Step (3), the presence of urea raises the pH value through generation of ammonia in the solution through the hydrolysis of urea, and gives the LDH by formation of hydroxide with coexisting metal ions. Also, generation of carbon dioxide in hydrolysis gives the LDH of a carbonate anion type.

In particular, a preferred method for producing LDH containing functional layers and composite materials has the following features, and these features are believed to contribute to putting into practice of various properties of the functional layer of the present invention. These features of the method include:

a) preparation of some kind of mixed sol (for example, amorphous alumina solution (Al-ML15, manufactured by Taki Chemical Co., Ltd.) and titanium oxide sol solution (M6, Manufactured by Taki chemical Co., Ltd.)) as a mixed sol of alumina and titania used in Step (2), b) heating of the sol applied to the porous base material at relatively low temperature, preferably 70 to 300° C. (for example, 150° C.), in Step (2), c) thickening of spin-coated layer (for example, the spin-coated thickness of 5 µm) by applying the sol several times through spin coating, d) supply of nickel ions ($Ni^{2+}$) in the form of nickel nitrate and addition of urea in a relatively high molar ratio of urea/$NO_3^-$, preferably 8 to 32 (for example, 16) in Step (3), e) hydrothermal treatment at a relatively low temperature of, preferably 70 to 150° C. (for example 110° C.), for a relatively long time of, preferably 6 hours or more, more preferably 8 to 45 hours in Step (4), and/or f) washing of the functional layer with ion-exchanged water after Step (4), and then drying the functional layer at a relatively low temperature of, preferably room temperature to 70° C. (for example, room temperature).

EXAMPLES

The present invention will be described in more detail by the following examples.

Example 1 (Comparative)

Various functional layers and composite materials including Ni/Al/Ti-containing LDH were prepared and evaluated by the following procedures.

(1) Preparation of Porous Substrate

One hundred parts by weight of zirconia powder (TZ-8YS manufactured by Tosoh Corporation), 70 parts by weight of a dispersing medium (xylene:butanol=1:1), 11.1 parts by weight of a binder (polyvinyl butyral: BM-2 manufactured by Sekisui Chemical Co., Ltd.), 5.5 parts by weight of a plasticizer (DOP manufactured by Kurogane Kasei Co., Ltd.), and 2.9 parts by weight of a dispersant (Rheodol SP-030 manufactured by Kao Corporation) were mixed, and the mixture was stirred to be deformed under vacuum to yield a slurry. The slurry was shaped into a sheet on a PET membrane with a tape shaping machine to yield a green sheet having the membrane thickness of 220 µm after drying. The green sheet was cut into 2.0 cm×2.0 cm×0.022 cm and fired at 1100° C. for two hours to yield a porous substrate made of zirconia.

The porosity of the porous substrate was measured to be 40% by Archimedes' method.

The observed mean pore size of the porous substrate was 0.2 µm. The mean pore size was determined by measuring the longest dimension of each pore based on the scanning electron microscopic (SEM) image of the surface of the porous substrate. The SEM image was observed at 20,000-fold magnification. All the measured pore sizes are listed in order of size to calculate the average, from which the subsequent 15 larger sizes and the subsequent 15 smaller sizes, i.e., 30 diameters in total, are selected in one field of view. The selected sizes of two fields of view are then averaged to yield the average pore size.

In the measurement, a dimension measuring function in software of SEM was used.

(2) Coating of Alumina/Titania Sol on Porous Substrate

An amorphous alumina solution (Al-ML15 manufactured by Taki Chemical Co., Ltd.) and a titanium oxide sol solution (M6 manufactured by Taki Chemical Co., Ltd.) (weight ratio of 1:1) were mixed to prepare a mixed sol. The zirconia porous substrate prepared in Procedure (1) was coated with 0.2 mL of the mixed sol by spin coating. In the spin coating, the mixed sol was dropwise added to the substrate spinning at a rotation rate of 8,000 rpm, then the spin was stopped after five seconds. The substrate was placed on a hot plate heated to 100° C. and dried for one minute. The substrate was then heated at 150° C. in an electric furnace. The thickness of the layer formed by this procedure was about 1 µm.

(3) Preparation of Aqueous Raw Material Solution Nickel nitrate hexahydrate ($Ni(NO_3)_2 \cdot 6H_2O$, manufactured by Kanto Chemical CO., Inc.), and urea (($NH_2$)$_2CO_3$ manufactured by Sigma-Aldrich Corporation) were provided as raw materials. Nickel nitrate hexahydrate was weighed to be 0.015 mol/L, placed in a beaker, and ion-exchanged water was added into a total amount of 75 mL. After stirring the solution, urea weighed at a urea/$NO_3^-$ molar ratio of 16 was added, and further stirred to give an aqueous raw material solution.

(4) Formation of Membrane by Hydrothermal Treatment

The aqueous raw material solution prepared in Procedure (3) and the substrate prepared in Procedure (2) were placed in a Teflon™ hermetic container (autoclave, the internal volume: 100 mL, and covered with stainless steel jacket). The substrate was horizontally fixed away from the bottom of the Teflon™ hermetic container such that the solution was in contact with the two surfaces of the substrate. A LDH was then formed on the surface and in the interior of the substrate by hydrothermal treatment at a temperature of 110° C. for three hours. After a predetermined period, the substrate was removed from the hermetic container, washed with ion-exchanged water, and dried at room temperature for twelve hours to yield a LDH containing functional layer partly embedded in the porous substrate. The thickness of the functional layer was about 5 µm (including the thickness of the portion embedded in the porous substrate).

Example 2

A functional layer and a composite material were prepared as in Example 1 except that the hydrothermal treatment was carried out for eight hours in the formation of membrane.

Example 3

A functional layer and a composite material were prepared as in Example 1 except that the hydrothermal treatment was carried out for 16 hours in the formation of membrane.

Example 4

A functional layer and a composite material were prepared as in Example 1 except that the hydrothermal treatment was carried out for 30 hours in the formation of membrane.

Example 5

A functional layer and a composite material were prepared as in Example 1 except that spin coating was carried out at a rotation rate of 4,000 rpm and repeated three times to thicken the spin-coated layer in the coating of alumina/titania sol, and the hydrothermal treatment was carried out for 45 hours in the formation of membrane. The thickness of spin-coated layer was 5 μm and the thickness of the resultant functional layer was about 10 μm.

<Evaluations>

The following various evaluations were performed on the resultant functional layers or composite materials.

Figure 2:
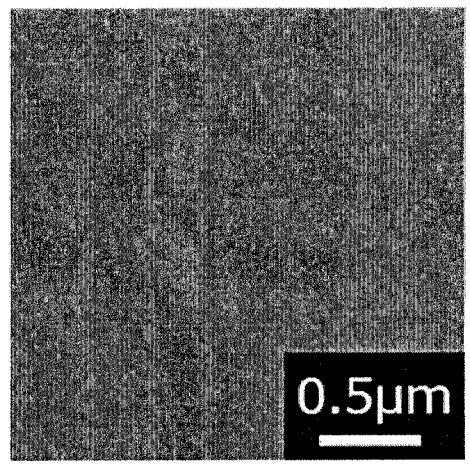
FIG. 2 is a SEM image of the surface of a functional layer produced in Example 1 (comparative).
Figure 3:
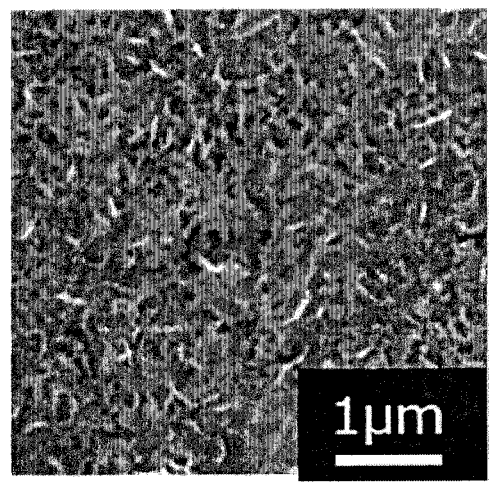
FIG. 3 is a SEM image of the surface of a functional layer produced in Example 3.
Figure 5:
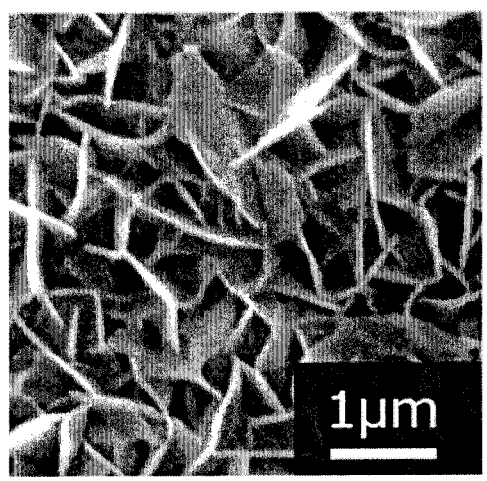
FIG. 5 is a SEM image of the surface of a functional layer produced in Example 4.

Evaluation 1: Observation of Surface Microstructure and Measurement of Mean Particle Diameter of Large Particles The surface microstructure of the functional layer was observed at an accelerating voltage of 10 to 20 kV with a scanning electron microscope (SEM, JSM-6610LV, manufactured by JEOL Ltd.). A second layer composed of large particles having a diameter of 0.05 μm or more was identified in the functional layers of Examples 2 to 5, while such a layer was not identified in the functional layer of Example 1 (comparative). For reference, FIGS. 2, 3 and 5 show the surface SEM images of the functional layers of Example 1 (comparative), Example 3 and Example 4, respectively. In the functional layers of Examples 2 to 5, the mean particle diameter was measured by the following procedures. Measurement of the mean particle diameter of the large particles constituting the second layer was performed by measuring the largest distance of the particle diameter based on the surface electron microscope (SEM) images of the functional layers. The images of the electron microscope (SEM) used in this measurement are observed at 10,000-fold magnification or more, and all the measured pore sizes are listed in order of size to calculate the average, from which the subsequent 15 larger sizes and the subsequent 15 smaller sizes, i.e., 30 diameters in total, are selected in one field of view. The selected sizes of two fields of view are then averaged to yield the average pore size. The measurement employed a dimension measuring function in software of SEM. The results are shown in Table 1.

Figure 4:
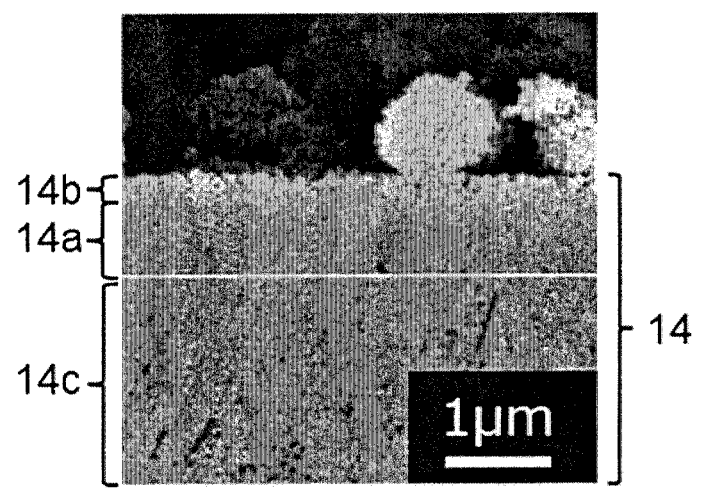
FIG. 4 is a cross-sectional SEM image of a functional layer produced in Example 3.
Figure 6:
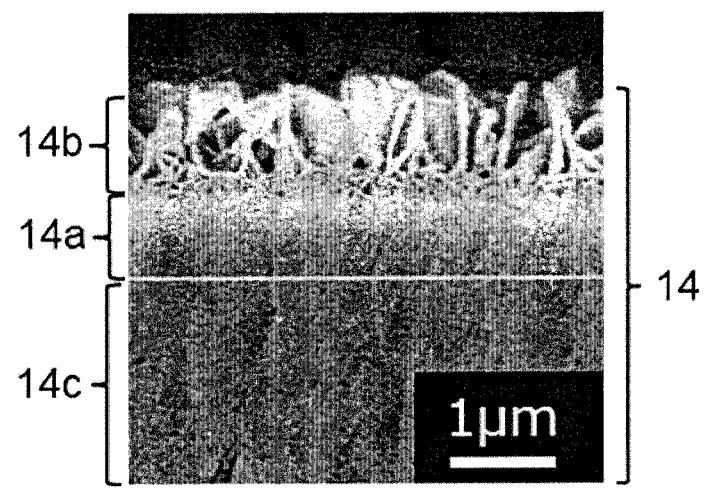
FIG. 6 is a cross-sectional SEM image of a functional layer produced in Example 4.

Evaluation 2: Observation of Cross-Sectional Microstructure and Measurement of Thickness After the preparation of the cross-sectional polished surface of the functional layer with an ionic milling system (IM4000, manufactured by Hitachi High-Technologies Corporation), the microstructure of the cross-sectional polished surface was observed with SEM under the same condition as the surface microstructure. The first layer composed of fine particles that is not embedded in the porous substrate (i.e., formed on the outermost surface of the porous substrate), the second layer composed of large particles and the third layer in which the particles are embedded in the porous substrate (i.e., formed inside the porous substrate) were identified in the functional layers of Examples 2 to 5, while the second layer composed of fine particles and the third layer in which the particles are embedded in the porous substrate were only identified in the functional layer of Example 1 (comparative). For reference, the cross-sectional SEM images of the functional layer 14 (i.e., the first layer 14a, the second layer 14b and the third layer 14c) of Examples 4 and 5 are shown in FIGS. 4 and 6, respectively. The thickness of the first layer and the thickness of the second layer were determined based on the resultant SEM images. The thickness of the first layer is 1.0 μm (Example 1), 0.8 μm (Example 2), 0.7 μm (Example 3), 0.8 μm (Example 4), 0.8 μm (Example 5). The thickness of the second layer is shown in Table 1, respectively.

Figure 7:
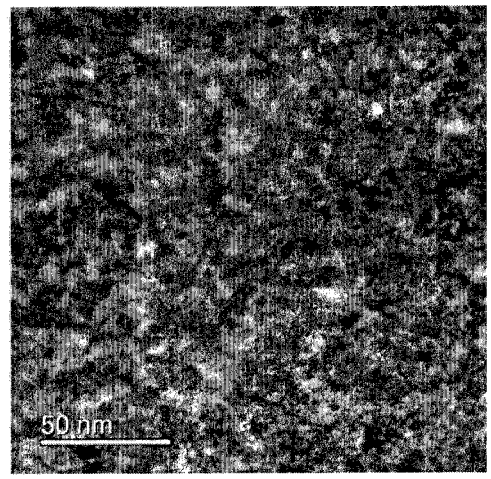
FIG. 7 is a BF-STEM image of a first layer in a functional layer produced in Example 4.

Evaluation 3: Observation of Fine Particles with STEM and Measurement of Diameter of Fine Particles The particle diameter of the fine particles contained in the first layer of the functional layer was measured by an atomic-resolution scanning transmission electron microscope (STEM). In particular, after preparation of a cross-sectional polished surface of the functional layer with an ionic milling system (Dual Mill 600 type, manufactured by GATAN, Inc.), the microstructure of the cross-sectional polished surface was observed with the atomic resolution transmission scanning electron microscopy (STEM, JEM-ARM 200F, manufactured by JEOL Ltd.) at an accelerating voltage of 200 kV. From the resultant BF-STEM images, the diameters of all fine particles contained in the first layer of Examples 1 to 5 were confirmed to be within the range of 0.025 μm or less. FIG. 7 shows a STEM image of the cross-sectional polished surface of the first layer in the functional layer of Example 4.

Evaluation 4: Evaluation of Alkaline Resistance I

Zinc oxide was dissolved in a 6 mol/L aqueous potassium hydroxide solution to yield 6 mol/L of aqueous potassium hydroxide solution containing zinc oxide in a concentration of 0.4 mol/L. 15 mL of the resultant aqueous potassium hydroxide solution was placed in a hermetic container made of Teflon™. A composite material having dimensions of 2 cm×2 cm square was placed on the bottom of the hermetic container such that the functional layer faced upward, and the cover was closed. The composite material was held at 70° C. for one week or 168 hours or for three weeks or 504 hours, and then removed from the hermetic container. The composite material was dried overnight at room temperature.

Figure 8A:
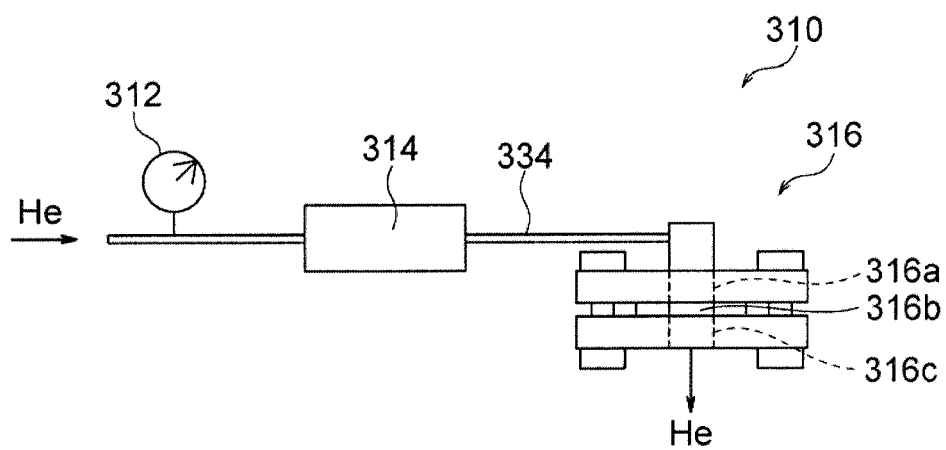
FIG. 8A is a schematic view illustrating an example system of measuring helium permeability used in Examples 1 to 5.
Figure 8B:
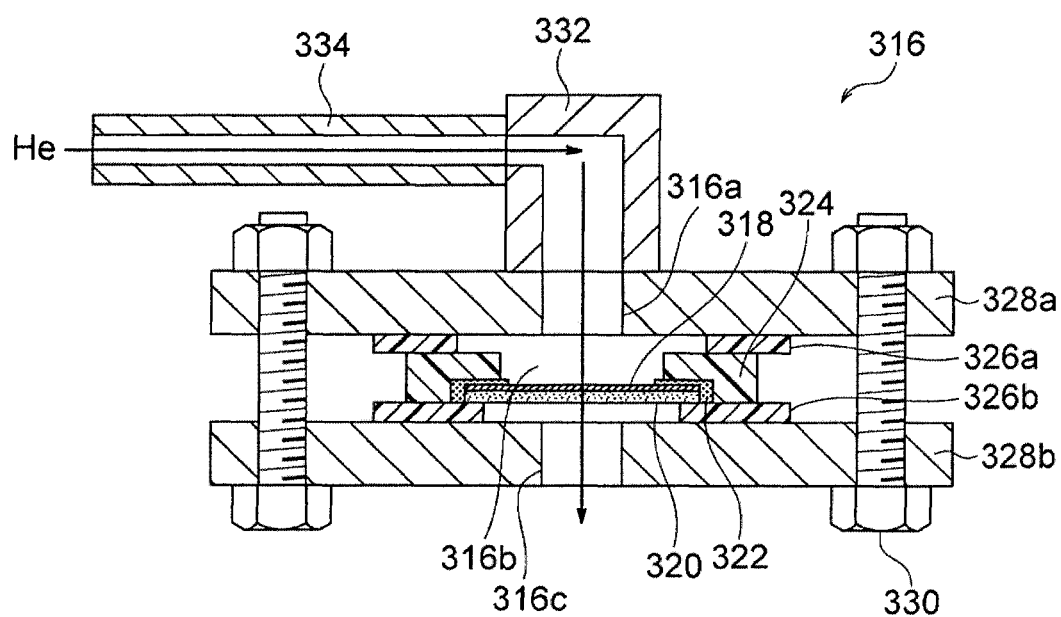
FIG. 8B is a schematic cross-sectional view of a sample holder and its peripheral configuration used in the system shown in FIG. 8A.

A helium permeation test was conducted to evaluate the density of the functional layer from the viewpoint of helium permeability in the resultant samples. The helium permeability measurement system 310 shown in FIGS. 8A and 8B was constructed. The helium permeability measurement system 310 was configured to supply helium gas from a gas cylinder filled with helium gas to a sample holder 316 through a pressure gauge 312 and a flow meter 314 (digital flow meter), and to discharge the gas by permeating from one side to the other side of the functional layer 318 held by the sample holder 316.

The sample holder 316 had a structure including a gas supply port 316a, a sealed space 316b and a gas discharge port 316c, and was assembled as follows: An adhesive 322 was applied along the outer periphery of the functional layer 318 and bonded to a jig 324 (made of ABS resin) having a central opening. Gaskets or sealing members 326a, 326b made of butyl rubber were disposed at the upper end and the lower end, respectively, of the jig 324, and then the outer sides of the members 326a, 326b were held with supporting members 328a, 328b (made of PTFE) each including a flange having an opening. Thus, the sealed space 316b was partitioned by the functional layer 318, the jig 324, the sealing member 326a, and the supporting member 328a. The functional layer 318 was in the form of a composite material formed on the porous substrate 320, and was disposed such that the functional layer 318 faced the gas supply port 316a. The supporting members 328a and 328b were tightly fastened to each other with fastening means 330 with screws not to cause leakage of helium gas from portions other than the gas discharge port 316c. A gas supply pipe 34 was connected to the gas supply port 316a of the sample holder 316 assembled as above through a joint 332.

Helium gas was then supplied to the helium permeability measurement system 310 via the gas supply pipe 334, and the gas was permeated through the functional layer 318 held in the sample holder 316. A gas supply pressure and a flow rate were then monitored with a pressure gauge 312 and a flow meter 314. After permeation of helium gas for one to thirty minutes, the helium permeability was calculated. The helium permeability was calculated from the expression of F/(P×S) where F (cm³/min) was the volume of permeated helium gas per unit time, P (atm) was the differential pressure applied to the functional layer when helium gas permeated through, and S (cm²) was the area of the membrane through which helium gas permeates. The permeation rate F (cm³/min) of helium gas was read directly from the flow meter 314. The gauge pressure read from the pressure gauge 312 was used for the differential pressure P. Helium gas was supplied such that the differential pressure P was within the range of 0.05 to 0.90 atm. The results are shown in Table 1.

Evaluation 5: Identification of Functional Layer

The crystalline phase of the functional layer was measured with an X-ray diffractometer (RINT TTR III manufactured by Rigaku Corporation) at a voltage of 50 kV, a current of 300 mA, and a measuring range of 10° to 70° to give an XRD profile. The resultant XRD profile was identified with the diffraction peaks of LDH (hydrotalcite compound) described in JCPDS card NO. 35-0964. The XRD profile identifies each of the functional layers in Examples 1 to 5 as the LDH (hydrotalcite compound).

Evaluation 6: Evaluation of Alkaline Resistance II

Zinc oxide was dissolved in a 6 mol/L aqueous potassium hydroxide solution to yield 6 mol/L of aqueous potassium hydroxide solution containing zinc oxide in a concentration of 0.4 mol/L. 15 mL of the resultant aqueous potassium hydroxide solution was placed in a hermetic container made of Teflon™. A composite material having dimensions of 1 cm×0.6 cm square was placed on the bottom of the hermetic container such that the functional layer faced upward, and the cover was closed. The composite material was held at 70° C. for three weeks or 504 hours, and then removed from the hermetic container. The composite material was dried overnight at room temperature. The microstructure of the resultant sample was observed with SEM and the crystalline structure was analyzed with XRD. A variation in crystalline structure was determined by a shift in the (003) peak derived from the LDH based on the XRD profile. No change in the surface microstructure and the crystalline structure was observed in all Examples 1 to 5.

Evaluation 7: Elemental Analysis (EDS)

The functional layer was polished across the thickness with a cross-sectional polisher (CP). One field of cross-sectional image of the functional layer was observed at a 10,000-fold magnification with FE-SEM (ULTRA 55, manufactured by Carl Zeiss). The LDH membrane on the substrate surface and the LDH portion (by point analysis) inside the substrate in this cross-sectional image was subjected to elemental analysis at an accelerating voltage of 15 kV with an EDS analyzer (NORAN System SIX, manufactured by Thermo Fisher Scientific Inc.). C, Al, Ti and Ni, which are constituent elements of the LDH, were detected from the LDH contained in the functional layers in Examples 1 to 5. Al, Ti and Ni are constituent elements of the basic hydroxide layer while C corresponds to $CO_3^{2-}$ that is an anion constituting the intermediate layer of LDH.

TABLE 1

| | After preparation of LDH (before immersion into alkaline solution) | | | Evaluation of alkaline resistance after drying | | |
|---|---|---|---|---|---|---|
| | A second layer | | | | | Helium permeability |
| | Large particles with a diameter | Mean particle | | Immersion conditions | | Helium permeability |
| | of at least 0.05 μm | diameter (μm) | Thickness (μm) | Temp. (° C.) | Time (weeks) | (cm/min · atm) |
| Example 1* | not found | — | — | 70 | 1 | 0.1 |
| | | | | 70 | 3 | 14 |
| Example 2 | found | 0.1 | 0.1 | 70 | 1 | 0.1 |
| | | | | 70 | 3 | 0.2 |
| Example 3 | found | 0.3 | 0.2 | 70 | 1 | 0.2 |
| | | | | 70 | 3 | 0.1 |
| Example 4 | found | 1.1 | 1.0 | 70 | 1 | 0.1 |
| | | | | 70 | 3 | 0.1 |
| Example 5 | found | 4.1 | 4.3 | 70 | 1 | 0.1 |
| | | | | 70 | 3 | 0.1 |

*comparative

What is claimed is:

1. A functional layer comprising a layered double hydroxide (LDH), wherein the functional layer comprises:
    a first layer with a thickness of 0.10 μm or more, the first layer being composed of fine LDH particles having a diameter of less than 0.05 μm; and
    a second layer composed of large LDH particles having a mean particle diameter of 0.05 μm or more, the second layer being an outermost layer provided on the first layer;
    wherein the first layer has a major surface and the second layer covers the entire major surface of the first layer.

2. The functional layer according to claim 1, wherein the fine LDH particles have the diameter of 0.025 μm or less, and the thickness of the first layer is 0.50 to 3.0 μm.

3. The functional layer according to claim 1, wherein the large LDH particles have the mean particle diameter of 0.1 to 5.0 μm, and the thickness of the second layer is 0.1 to 10 μm.

4. The functional layer according to claim 1, wherein the layered double hydroxide undergoes no change in surface microstructure and crystalline structure when immersed in a 6 mol/L aqueous potassium hydroxide solution containing zinc oxide in a concentration of 0.4 mol/L at 70° C. for three weeks.

5. The functional layer according to claim 1, wherein the layered double hydroxide is composed of a plurality of basic hydroxide layers composed of Ni, Ti, and OH groups or composed of Ni, Ti, OH groups and incidental impurities; and intermediate layers composed of anions and $H_2O$, each intermediate layer being interposed between two adjacent basic hydroxide layers; or
wherein the layered double hydroxide is composed of a plurality of basic hydroxide layers comprising Ni, Al, Ti, and OH groups; and intermediate layers composed of anions and $H_2O$, each intermediate layer being interposed between two adjacent basic hydroxide layers.

6. The functional layer according to claim 1, wherein the layered double hydroxide composing the second layer includes agglomerates of platy particles, the platy surfaces of the platy particles being oriented perpendicular or oblique to a layer surface of the functional layer.

7. The functional layer according to claim 1, wherein the functional layer has a helium permeability per unit area of 10 cm/min·atm or less.

8. The functional layer according to claim 1, wherein the functional layer has a thickness of 100 μm or less.

9. The functional layer according to claim 1, wherein the functional layer has a thickness of 50 μm or less.

10. The functional layer according to claim 1, wherein the functional layer has a thickness of 15 μm or less.

11. A composite material comprising:
a porous substrate; and
a functional layer according to claim 1 provided on the porous substrate and/or partly embedded in the porous substrate.

12. The composite material according to claim 11, wherein the porous substrate is composed of at least one selected from the group consisting of ceramic materials, metallic materials, and polymeric materials.

13. The composite material according to claim 11, wherein the composite material has a helium permeability per unit area of 10 cm/min·atm or less.

14. A battery comprising, as a separator, the functional layer according to claim 1.

15. A battery comprising, as a separator, the composite material according to claim 11.

* * * * *